Figures 13, 16:
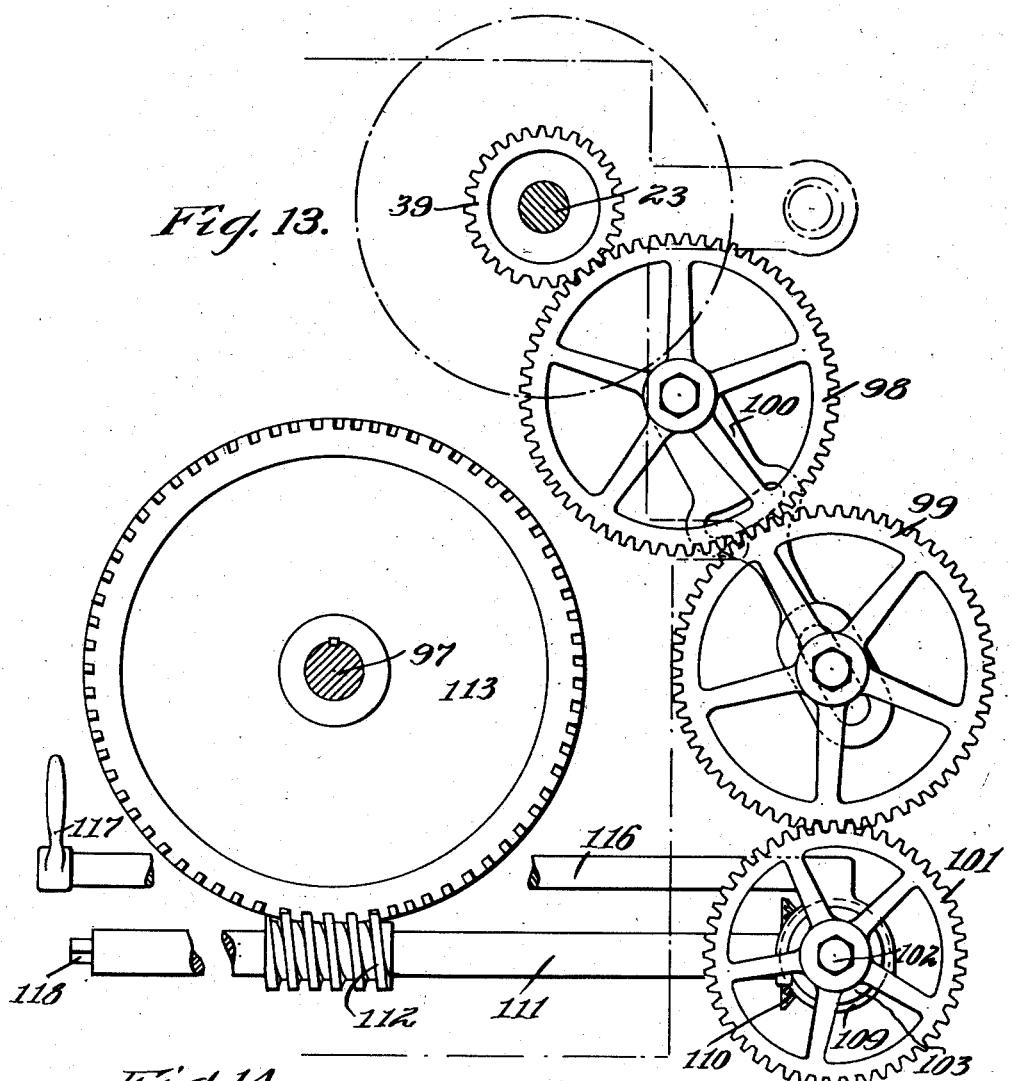

No. 874,035. PATENTED DEC. 17, 1907.
G. G. PRENTICE.
MULTIPLE SPINDLE AUTOMATIC TURRET MACHINE.
APPLICATION FILED OCT. 27, 1905.
7 SHEETS—SHEET 1.
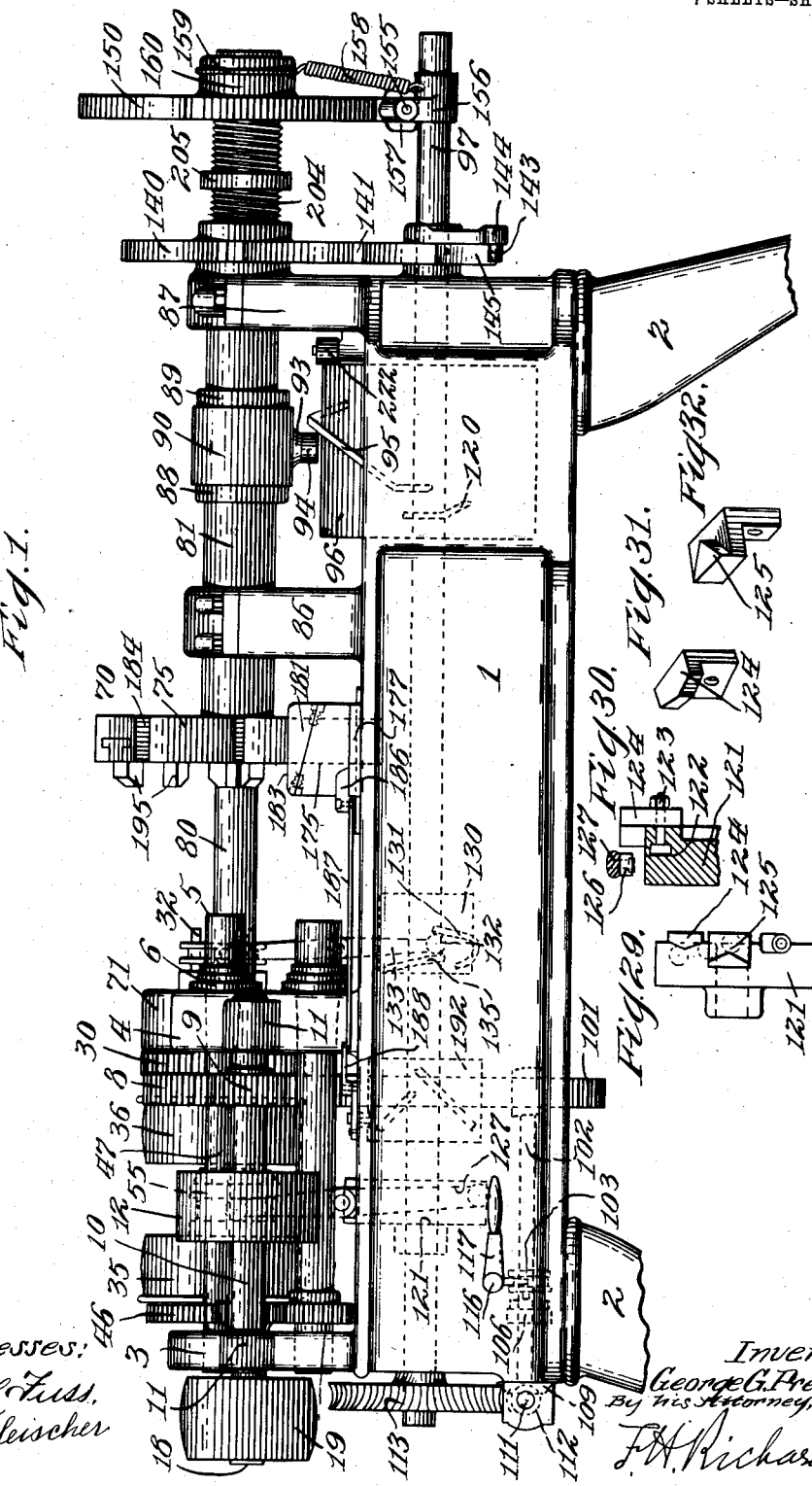

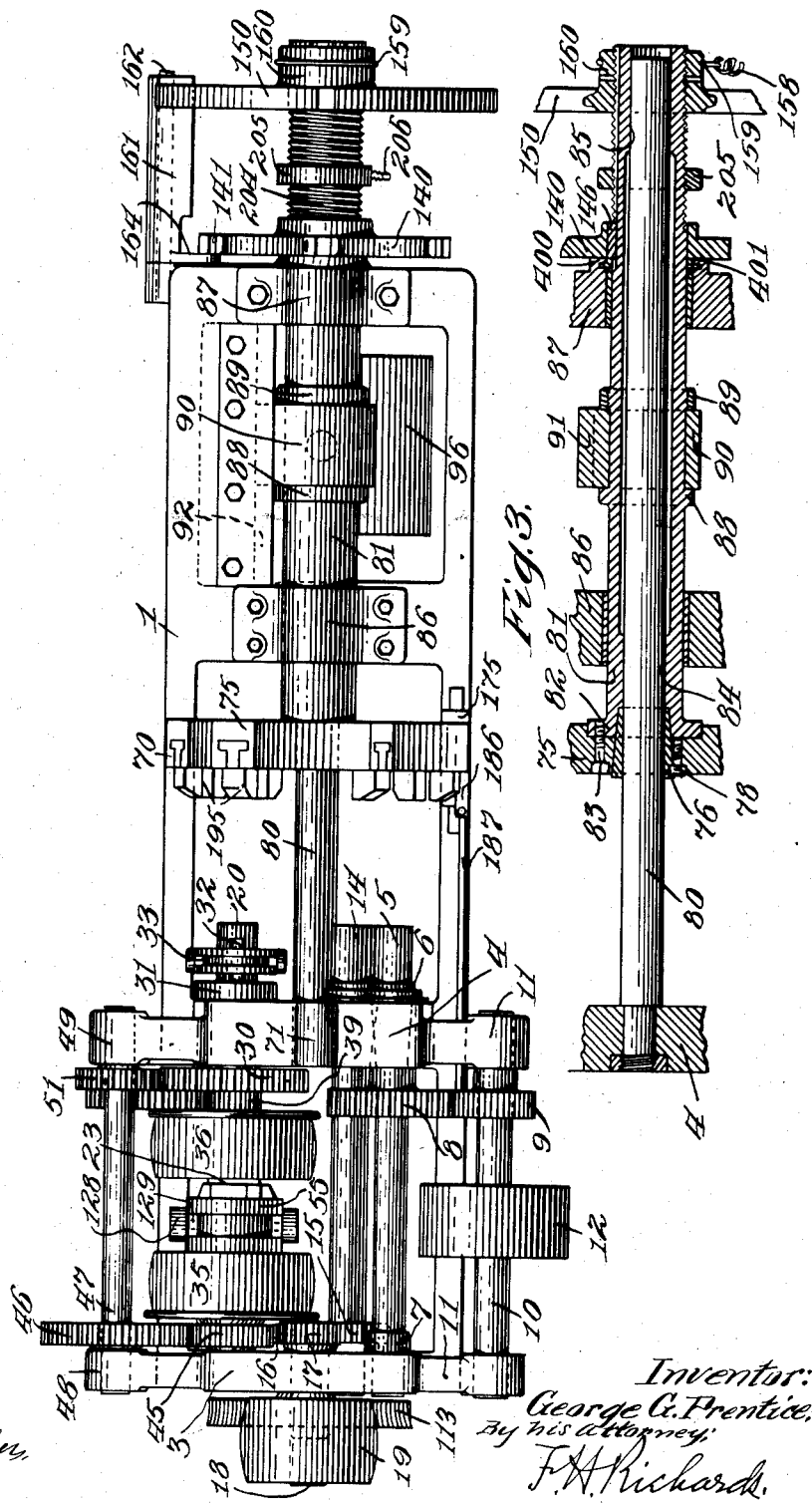

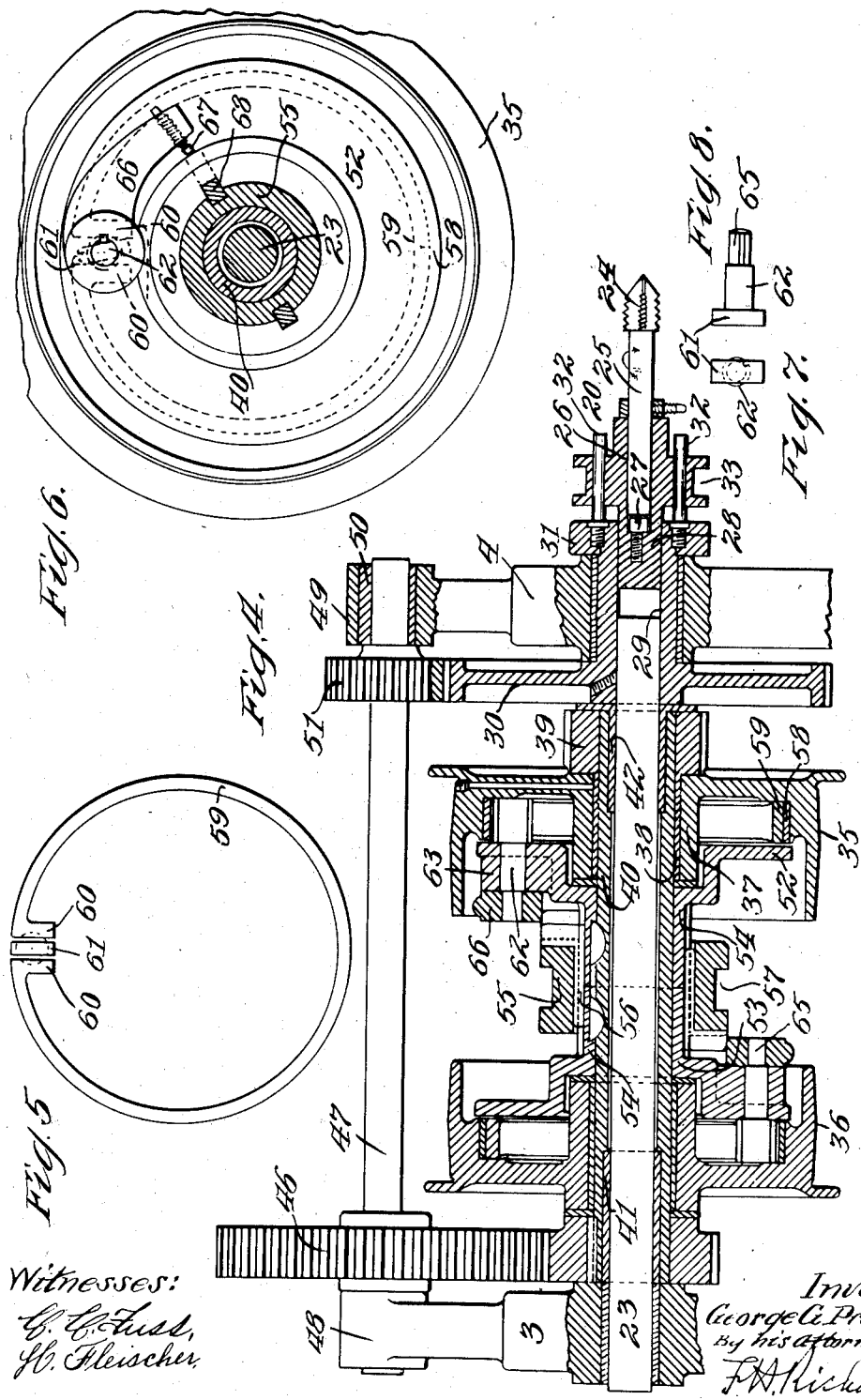

No. 874,035. PATENTED DEC. 17, 1907.
G. G. PRENTICE.
MULTIPLE SPINDLE AUTOMATIC TURRET MACHINE.
APPLICATION FILED OCT. 27, 1905.
7 SHEETS—SHEET 4.
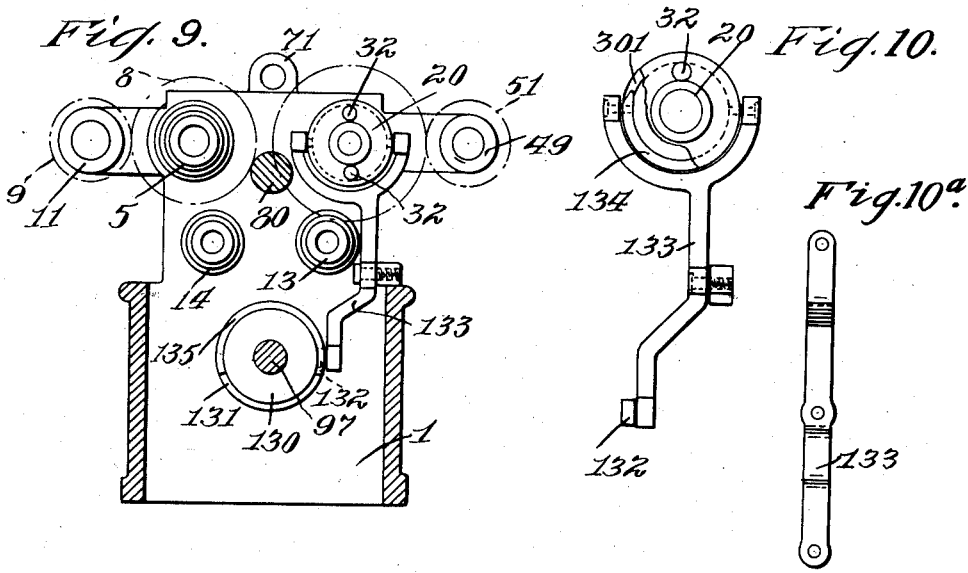
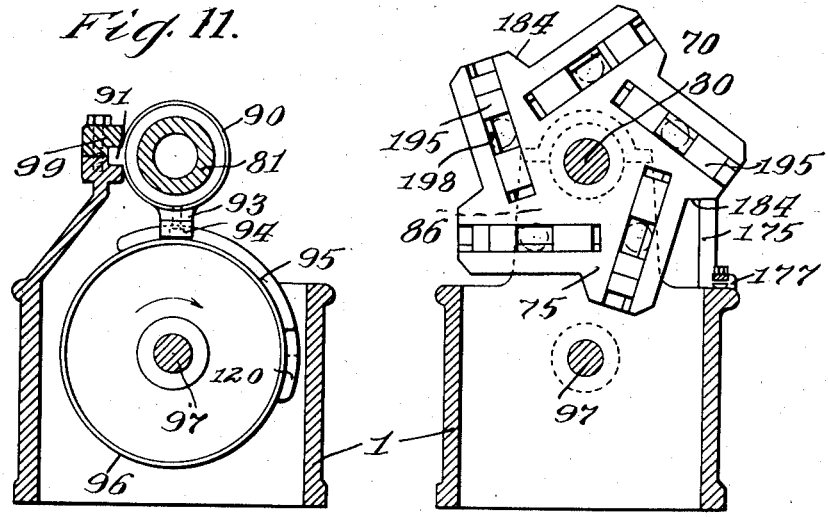
Witnesses:
C. C. Fuss.
H. Fleischer.
Inventor:
George G. Prentice,
By his attorney,
F. H. Richards.

No. 874,035. PATENTED DEC. 17, 1907.
G. G. PRENTICE.
MULTIPLE SPINDLE AUTOMATIC TURRET MACHINE.
APPLICATION FILED OCT. 27, 1905.

7 SHEETS—SHEET 5.

Witnesses:

Inventor:
George G. Prentice,
By his attorney
F. H. Richards

No. 874,035. PATENTED DEC. 17, 1907.
G. G. PRENTICE.
MULTIPLE SPINDLE AUTOMATIC TURRET MACHINE.
APPLICATION FILED OCT. 27, 1905.

7 SHEETS—SHEET 6.

Witnesses:
C. C. Fuss
H. Fleischer

Inventor:
George G. Prentice,
By his attorney,
F. H. Richards.

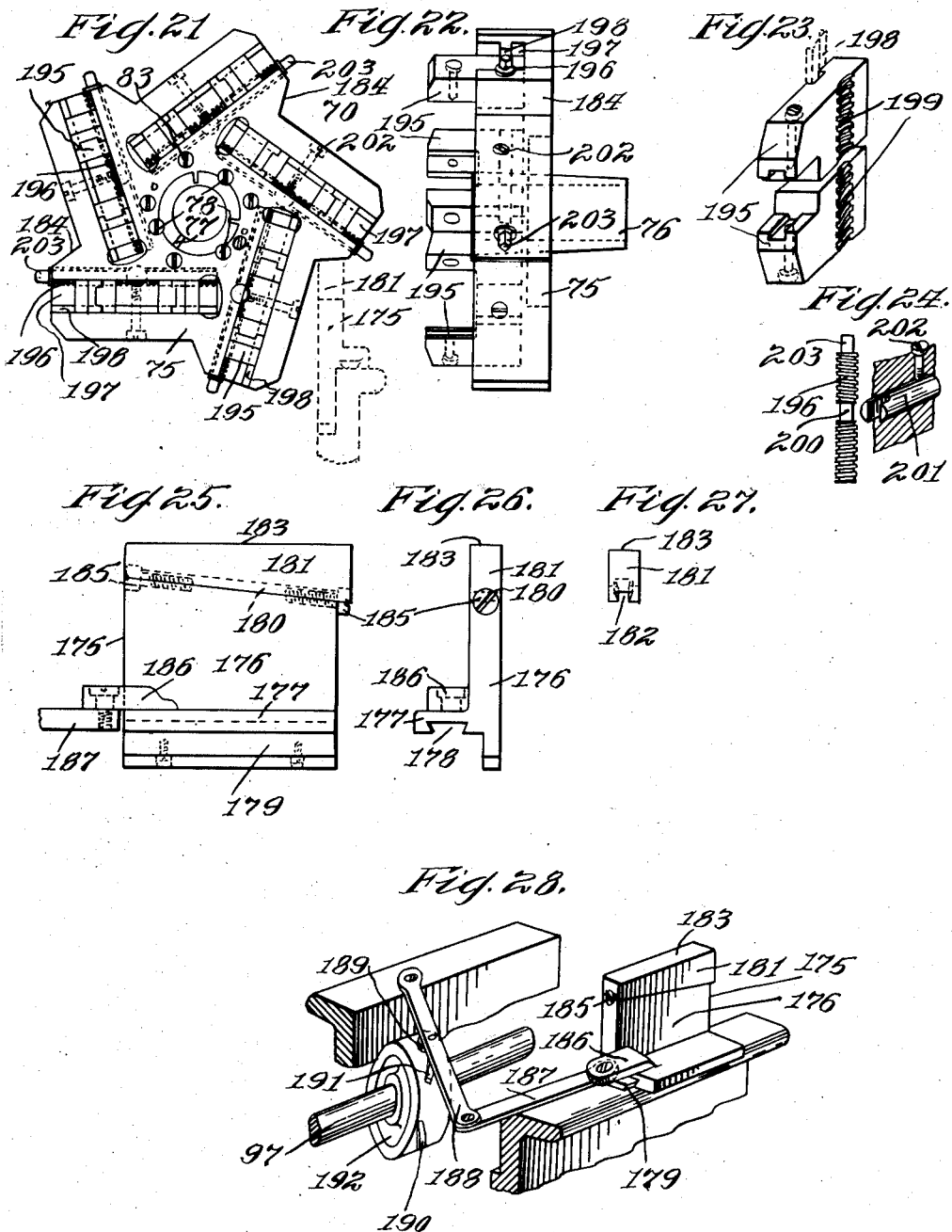

UNITED STATES PATENT OFFICE.

GEORGE G. PRENTICE, OF NEW HAVEN, CONNECTICUT.

MULTIPLE-SPINDLE AUTOMATIC TURRET-MACHINE.

No. 874,035.　　　　Specification of Letters Patent.　　　Patented Dec. 17, 1907.

Application filed October 27, 1905. Serial No. 284,624.

*To all whom it may concern:*

Be it known that I, GEORGE G. PRENTICE, a citizen of the United States, residing in New Haven, in the county of New Haven and State of Connecticut, have invented certain new and useful Improvements in Multiple-Spindle Automatic Turret-Machines, of which the following is a specification.

This invention relates to machine tools, and more particularly to multiple spindle automatic turret machines, and an object of the present improvement is to provide a machine of this character wherein a number of tools are mounted for simultaneous operation, and toward which a number of stock pieces will be advanced for the operation of the tools, and retracted and angularly advanced and again advanced toward the tools, and one of which tools may be advanced to meet the stock, and if this is a threading tool the sum of its advance and the advance of the stock while they are in working engagement will be the advance of the thread cut upon the stock, that is, the sum of the pitch of the lead screws for the chuck and for the threading tool will be the pitch of the thread formed.

The machine, the subject of the present improvement, is entirely automatic in operation, and is designed for rapidly and accurately performing all boring, turning, drilling, reaming, threading and other operations on castings, forgings and similar pieces, and also upon pieces that have been finished at one end in a rod machine and cut from the bar and require further operations on the reverse end.

In the present improvement there are provided a number of spindles each carrying a tool for a different operation in succession in performing a series of operations for the completion of a single piece. Each of the spindles rotates upon its axis and the work is automatically indexed and fed up to the rotating tools by means of suitable cams, in the present illustration, cam straps on a feed drum. The length of the longest operation required on any piece determines the angle of the feed cam. The proper feed or advance for the stock for cutting the same is obtained by driving the cam shaft from one of the spindles, which may be gearing and consist of change gears extending from one of the spindles to a feed shaft at the back of the machine and through miter and worm gears to the cam shaft. For different work the feed can be quickly changed by substituting a gear of the desired number of teeth for the one on the feed shaft. The spindle which is selected for this feed gear connection is generally the threading spindle since it is essential that the feed be controlled by the threading tool rather than by some of the boring or milling tools; since if the tool carried by one of the other spindles should be overloaded for some reason and slip it would not affect the threading operation in the present arrangement as would be the case were the feed controlled by the spindle of the tool which slipped. If the feed for the threading tool were controlled by any other spindle than by the threading spindle the threads would be injured when such other spindle departed in its speed from the predetermined uniform speed; but in the present instance whether the threading tool works faster or slower, momentarily, than some of the other spindles, the feed will be regulated accordingly and the thread will be perfect in every instance.

In the present illustration there are shown four spindles, and the turret for holding the stock has five chucks for receiving the same. Before starting the machine the operator will place a piece of work in the uppermost chuck; the machine will then be started and the turret will index around automatically, bringing the piece of work in line with the tool on the first spindle at the front of the machine. The turret will be advanced automatically and the first operation be performed. In the meantime the operator will place another unfinished piece in the chuck of the turret, which is then at the top of the machine, and when the turret again indexes such second piece is brought in line with the first spindle and the first piece is facing the second spindle. The turret is then advanced and the first and second tools engage with the respective pieces of work. The turret then backs off and indexes as before and a third piece which has meanwhile been placed in the chuck that is then at the top position is brought to the first spindle and the first and second pieces are in line with the third and second spindles respectively. This continues until four pieces are being simultaneously operated upon, each receiving a different operation. When the turret again indexes, bringing a fifth piece to the first spindle the first piece having passed through all the operations is again at the top position of the turret. Such piece is now in a finished condition and is removed by the operator, who will put in its place an unfinished piece. The machine continues to operate in this manner and need not be stopped except to replace dull tools with sharp ones; the operator removing the finished piece from the chuck and replacing it by an unfinished piece during the time that the turret is advancing toward the spindles and the work is progressing.

The great saving in time effected by this machine is due to the fact that the machine is not stopped to chuck the work, but that all operations on any piece are finished complete within the time that would be required to finish the longest operation only. The method of camming is such that all the shorter operations on any piece are performed within the time consumed in finishing the longest operation.

It should be understood that the high rate at which work is produced in this machine is not due to running the tools at excessive cutting speeds and feeds, but it is because a number of pieces are operated upon at one time and no time is wasted in chucking the work. The operator need be only sufficiently intelligent to place the rough work in the chuck and remove the finished pieces as the turret indexes around.

Another feature of the invention resides in the fact that while the tools are cutting the turret is relieved of all vibratory and torsional strain and is held perfectly rigid by a steady rest which will slide under a suitable ledge of the turret at the front of the bed after the turret has indexed, suitable levers being provided for withdrawing the steady rest out of the way of the turret before it indexes and moving it up automatically before the tools start cutting again. The steady rest will be so positioned that it will receive the angular strain imposed upon the turret by the working engagement of the tools carried by the spindles with the work carried by the turret, which tools have a rotary motion and will tend to rotate the turret, relieving the torsional strain thus put upon the turret barrel.

There are other details of the improvement which will be treated each in its proper place in the description which follows.

Figures 14, 15:
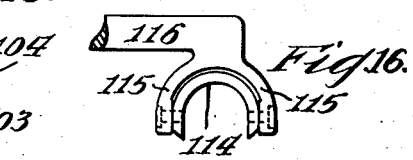
Figure 17:
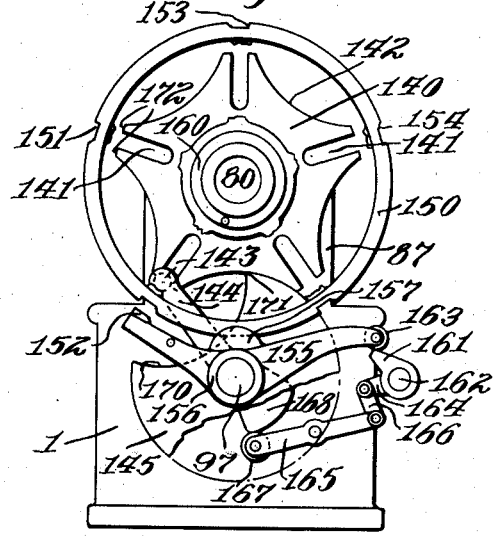
Figure 18:
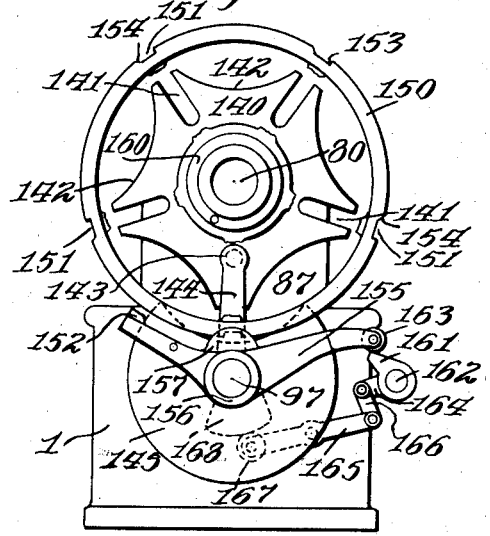
Figure 19:
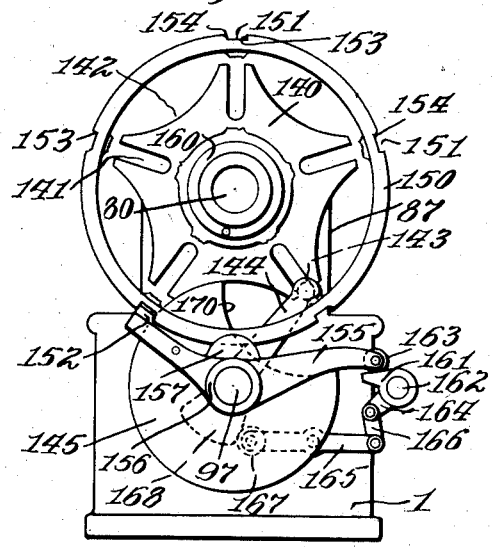
Figure 20:
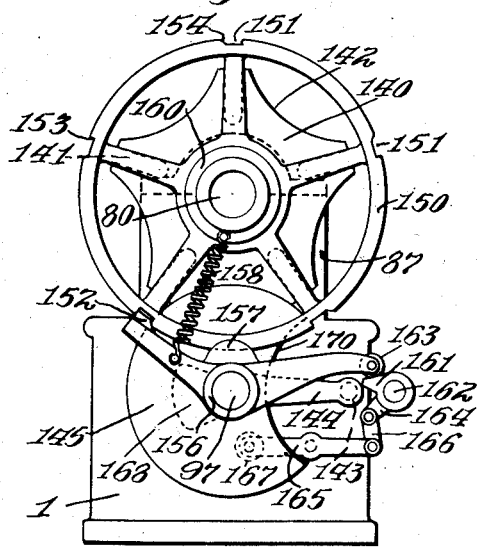

In the drawings accompanying and forming a part of this specification Figure 1 represents a front elevation of a practicable embodiment of a form of the present improvements. Fig. 2 is a top plan view thereof. In this view, however, one of the lower spindles is not illustrated since to show the same in the drawing its lines would confuse the lines of the threading spindle, that is, the upper spindle at the back of the machine. Fig. 3 is a horizontal section through the turret barrel and turret barrel steady bar. This view is projected from Fig. 2, as will be apparent. Fig. 4 is a horizontal section through the threading spindle and the clutch mechanism for driving the same. Fig. 5 is a detail of a friction ring. Fig. 6 is a detail of a friction clutch. Figs. 7 and 8 are end and side views respectively of the friction ring actuator or spreader. Fig. 9 is a cross section of the machine taken in front of the spindles and looking at the same from the right hand end. Fig. 10 is a detail of the shifter for the threading tool for advancing the same and withdrawing it from its work. Fig. 10ª is a side view thereof. Fig. 11 is a cross section of the machine in front of the cam drum for feeding the turret and looking at the same from the left hand end of the machine. Fig. 12 is a cross section of the machine in front of the turret and looking at the same from the left hand end of the machine. Fig. 13 is an enlarged detail illustrating the train of gearing for driving the cam shaft; this train of gears in the present instance being driven from the threading spindle. Fig. 14 is a detail of a portion of such train of gear and illustrates a disconnecting device. Fig. 15 is an end view of the shiftable spool shown in Fig. 14. Fig. 16 is a detail of the end of the shifter for such spool. Fig. 17 is a right hand end elevation of the machine showing the spokes of the indexing wheel broken away to illustrate the star wheel device and certain of its operating mechanisms; this view shows the parts just prior to the advance of the turret and turret barrel one step in its step by step rotation. Fig. 18 is a similar view showing the parts in the positions they assume when the turret has been advanced one half of a step. Fig. 19 is a similar view showing the parts at the completion of a step in advance with the index pawl indexing the wheel and the stop action for the star wheel having come into position to arrest the further advance thereof, but the latter not having quite assumed its locking position against movement in both directions. Fig. 20 shows the same parts with the indexing pawl in its position and with the stop for the star wheel in its position for preventing rotation in either direction. Fig. 21 is a detail of the face of a form of turret and chucks for holding the work. Fig. 22 is a side view thereof. Fig. 23 is a detail in perspective of the chuck jaws removed. Fig. 24 is a detail in perspective of the right and left hand screw and its holding device for operating the jaws. Fig. 25 is a detail in side view of an adjustable steady rest for the turret. Fig. 26 is an end view thereof. Fig. 27 is an end view of the adjustable portion of the steady rest removed. Fig. 28 is a perspective of the steady rest and its actuating mechanism for advancing it into engagement with the turret and for withdrawing it from the turret to permit the same to properly index. Fig. 29 is a detail of the cam wheel for controlling the clutch of the threading tool whereby the same is advanced and reversed. Fig. 30 is a partial sectional view thereof showing one of the cams and also the engaging end of the clutch lever. Fig. 31 is a perspective view of the cam for throwing the clutch into the forward pulley; and Fig. 32 is a perspective view of the reversing cam.

The various parts of the machine are shown mounted upon some suitable framework embodying a bed portion 1, supported by some suitable legs 2, and which framework has at its left hand end a pair of upstanding brackets 3 and 4 for affording bearings for the tool carrying spindles. Assuming that the turret will be rotated in its step by step advance toward the front of the machine the tool upon the first spindle will operate upon the newly chucked work and will be the upper spindle designated by the reference character 5, and which spindle is mounted in some suitable bushings 6 and 7 in bearings in the upstanding brackets before referred to, the spindle 5 is shown as carrying a gear 8, which is in mesh with a pinion 9 fast upon a shaft 10 mounted in brackets 11 extending from the upstanding brackets, and which shaft has fast upon it a pulley 12 for receiving some suitable belt for driving the same. What may be called the second and third spindles are also shown mounted in similar bushings in bearings in the upstanding brackets, and which spindles are herein designated by the reference characters 13 and 14 respectively, which spindles have fast upon them gears 15 and 16 respectively meshing with a pinion 17 fast upon a stub shaft 18 which carries a pulley 19 adapted to be driven by some suitable belt. The first spindle since it will have the roughing work to perform will be driven preferably by an independent belt so that whatever retardation it may have from overload or where the work does not require much roughing whatever acceleration it might have over the other spindles will not interfere with their normal running and working. The first spindle may in some instances carry the facing tool. The work of the second and third spindles will frequently be of a boring and milling character and may be run from one belt without experiencing any difficulty in some cases.

According to the equipment of the machine illustrated herein the fourth spindle will operate the threading tool, either a tap or die as the case may be, and since the threading operation in addition to getting the tool away from the work is sometimes the longest to be performed on the work it will be necessary to advance the threading tool to the stock and then back the same off after it has completed its thread, and for the purpose of preventing the retardation and acceleration of the other tools in their work affecting the threading tool and causing it to mar its work, this tool will have a separate drive of its own and will also control the advance and retreat of the work carrying turret. The threading tool spindle is herein designated by 20, and in the present instance is supported by the brackets 3 and 4, and the various parts are largely mounted and supported upon a steady bar 23 fast with the bracket 3. A threading tool 24 is shown herein merely for the purpose of illustration, and the shank 25 of such tool is received in a chuck 26 which has at its back end a screw 27 acting as a back stop for the shank of the threading tool so that its position may be adjusted with accuracy. The rear portion 28 of the chuck is slidable in the bore 29 of the hub of a gear wheel 30, which hub has a suitable bearing in the bracket 22 and is supported by the steady bar 23; the front end of the hub has upon it a ring 31 which is held in place by the screw threaded end of pins 32, which pins project in a direction parallel with the axis of the chuck. The body of which chuck is illustrated as a spool having a groove 33 whereby it and the tool may be shifted toward and from the work in a manner presently to be described.

The forward and reversing drive of the threading spindle will be by means of open and crossed belts running upon pulleys 35 and 36 respectively, which pulleys in a general way may be stated to be mounted upon the steady bar 23. The forward driving pulley 35 has a hub 37 inside of which is driven a bushing 38 fast with a pinion 39, which bushing and pinion are loose upon a quill 40 which is supported by the steady bar 23 by means of bearing bushings 41—42 located adjacent to the bearings 21 and 22. The pinion 39 is for driving the cam shaft, which cam shaft will be continuously rotated by the rotation of the forward driving pulley for the threading spindle and at a constant speed therewith. The hub 23 of the reversing pulley 36 has a bushing 43 driven into it, which bears upon the quill 40. The quill has fast upon it adjacent to the bearing 21 a pinion 45 which meshes with a gear wheel 46 fast upon a shaft 47 which is supported by suitable bearings 48—49, which are in the present instance extensions of the bearing brackets 3 and 4. The journals of the shaft 47 may be supported by suitable eccentric bushings 50 permitting adjustment. The shaft 47 has fast upon it a pinion 51 in mesh with the gear wheel 30 which is fast with the threading spindle. Each of the pulleys 35 and 36 has mounted adjacent to it and fast with the quill 40, a friction pulley hub, 52 and 53 respectively, which are substantially the same in their construction and but one of which will be described in detail. The friction hub has a hub portion 54 in the nature of a sleeve, the sleeves of both of which hubs are combined to form a bearing for a reciprocable spool 55, which in the present instance may be splined at two sides by some suitable splines 56 to the combined sleeves 54. The spool has a channel 57 for some suitable actuator. Each of the pulleys is shown as having fast within it a wear resisting ring 58 and loose within it and adapted to engage said ring a friction ring or shoe 59, this being split at one side and having reinforced abutments 60 for receiving a spreader or actuator head 61, (see Figs. 5 to 8 inclusive), which actuator head 61 is carried by a stud 62 mounted in a bearing 63 in the flange 52 of the friction hub, which flanges when in position serve to hold the loose friction rings 59 from displacement when they are not under tension. The stud 62 has a projecting end 65 to which is keyed an actuator arm 66, it having an adjustable engagement face, in the present instance carried by a screw 67 for engaging an actuator key 68 carried by the spool 55, so that when the spool is reciprocated one or the other of the keys will slide under the engaging face 67 and rock the lever 66, thereby turning the head 61 between the abutments 60 and spreading or expanding the ring, thereby causing the pulley in which it is expanded to rotate the friction hub and with it the quill 40, which through the train of gears 45, 46, 51 and 30 will control the direction of rotation of the threading spindle. The pulleys are always rotating in opposite directions.

Without at this time describing the details of its operation it will be assumed that the work carrying dial or turret will be advanced and retracted toward and from the spindles, and that as it is advancing toward the spindles and is about to cause the work chucked thereon to engage the tools chucked in the spindles the threading spindle will be advanced so that its tool will come into position to work at or prior to the working of the other tools, and the relation of the parts for reversing and for forwardly driving the threading spindle to the parts for the advance and retraction of the same and for advancing and retracting the turret or dial will be so timed one relatively to the other that the threading tool will be advanced to and perform its work and will be withdrawn from the same at the proper instant so that it will produce properly formed screw threads and will not mar the same in being withdrawn therefrom.

The work carrying dial or turret, designated herein in a general way by 70, in the present instance carries five work holding chucks located at equal distances apart, and the centers of the spindles each occupy one of the angles of a pentagon, the fifth angle may be occupied by a socket 71 for receiving some instrument for positioning the new work when being chucked. The turret body 75 is shown as having within it an adjustable compensatory split taper bushing 76, and in one of the splits of which some material such as a wedge of hard wood 77 may be inserted, which taper bushing is adjusted and secured in place by means of suitable screws 78, and the taper bushing forms a bearing upon the turret steady bar 80, which is fastened to the bracket 4 and extends toward the front end of the machine. The turret is also fastened to the turret barrel 81 which has a flange 82 secured by suitable screws 83 passing through the turret and through such flange; the turret barrel also has a bearing upon the steady bar 80, in the present instance at two points, 84 and 85. The turret barrel is also journaled in suitable bearings 86 and 87 carried by the machine bed, the turret barrel being mounted in such bearings to permit rotation and reciprocation therein. The turret barrel is provided with a pair of shoulders or abutment faces 88 and 89, one of which may be longitudinally adjustable for compensating for wear, etc., and between which a yoke 90 is mounted, which yoke has a web 91 projecting from it and guided in a suitable guideway 92 for preventing angular movement of the yoke with the angular movement of the turret barrel, but permitting its longitudinal reciprocation. The yoke carries a stud 93, which may be in the form of a screw, having a roll 94 upon it which will engage a cam strap or strip 95 upon a cam drum 96 fast upon the cam shaft 97, which cam shaft is driven from the forward driving pulley for the threading spindle through the gear 39, which as before stated is fast with such driving pulley, and by means of a train of gears comprising a pair of idlers 98 and 99 supported by a suitable bracket 100, and one of which idlers, as 99, is interchangeable for permitting the interchangeability of the gear 101, which is fast upon a shaft 102, upon which is splined for longitudinal reciprocation a spool 103 having pins 104 for engaging pins 105 carried by a collar 106 fast on a sleeve 107 interposed between the shaft 102 and some suitable bearings 108, and which sleeve is fast with a miter gear 109 which miter gear is in mesh with a miter gear 110 fast upon a shaft 111 carrying a worm 112 meshing with a worm wheel 113 fast upon the cam shaft. A shoe 114 is pivoted to arms 115 of the rock shaft 116 having some suitable handle 117 whereby the worm shaft may be connected and disconnected from the drive of the pulley 35 so that in case it is desired to stop the advance or retreat of the turret or to adjust the same the parts may be disconnected and a winch applied to a suitably formed end 118 of the worm shaft 111 whereby the cam shaft may be rotated in either direction by hand as occasion may demand.

The structure, which corresponds to lead screws, in this present construction is properly disposed cams. There is a cam for advancing the work carrying dial or turret toward the tool spindles and there is another cam for advancing one of these tool spindles toward the turret or dial, and this spindle will carry the threading tool. After such tool has been brought into working relation with the work it will have to have a different movement relatively to the work than during its period of advance, and during its working movement the lead screw effect of the concurrent action of the cams for advancing the turret and for controlling this screw will be the equivalent of a lead screw of the pitch of the screw thread which is being produced.

The cam drum 96 has a strap 95 for engaging the roll on the yoke 90 and advancing the turret toward the spindle and also has a strap 120 for engaging said roll and retracting or causing the turret to retreat from the spindles, a suitable thrust sheave 222 will maintain the proper position of the cam barrel.

The forward drive and the reverse of the threading spindle is controlled by a cam 121, (see Figs. 29 and 32 inclusive), which is fast upon the cam shaft and has a channel 122 having overhung edges for receiving the head of some suitable bolt 123 for holding the cam dogs 124 and 125 in place and whereby said dogs may be properly adjusted upon the cam wheel or drum. The dogs 124 and 125 which constitute cam faces will engage a roll 126 carried by a lever 127 pivoted to the bed of the machine, and which lever has a forked end 128 carrying a shoe 129 running in the groove 57 of the spool 55 whereby the spool will be reciprocated in unison with a certain predetermined timing of the reciprocation of the work carrying turret so that the proper key 68 will slide under the operative face 67 and cause the proper friction ring to expand and thereby direct the proper rotation of the spindle 20.

The threading spindle chuck will be reciprocated for advancing the threading tool toward the work and retracting the same therefrom at the proper time, the cam shaft being provided with a cam drum 130 for this purpose, it being provided with a cam strap 131 for engaging a roll 132 carried by a lever 133 pivoted to some suitable part of the machine, such lever being shown in detail in Fig. 10; the lever having forked ends carrying a shoe 134 running in the channel 33 of the spool which constitutes the body of the threading chuck. The reverse excursion of reciprocation of the threading tool is effected by the cam strap 135 after the roll 132 has run off the strap 131, and this will be of such pitch and so timed relative to the reverse rotation of the threading tool that the same will readily run out or off of the screw which it has previously formed without injury to the threads.

The step by step rotation of the work carrying turret is effected in the present organization when the same is at rest after its retardation and before it is again advanced. The turret barrel having splined upon it a star wheel 140, held from reciprocation by a flange 400 of the bearings running in a groove 401 in its hub. The star wheel has a number of radial slots 141 equal in number to the chuck positions upon the turret, in the present instance five, and between such slots a number of concave faces 142. The slots 141 are for the engagement of a roll 143 carried by an arm 144 fast with the cam shaft 97 so that upon the continuous rotation of the cam shaft the roll 43 will be passed into one of such slots 141 to advance the turret barrel one-fifth of a rotation, and will then pass out of such slot and move idly around until it engages the next succeeding slot. The cam shaft also has fast upon it a mutilated disk 145 equal in radius with the concave faces 142, and which disk will during the periods when the turret barrel is not to rotate engage one of the faces 142 and prevent such rotation or movement in either direction. The star wheel is prevented from longitudinal movement with the turret barrel as above stated and is secured thereto by a suitable spline 146 so as to cause the turret barrel to move angularly with the angular movement of the star wheel. The turret barrel also has fast upon it an index wheel 150 which has about its perimeter a number of index notches 151 for the engagement of a pawl 152; it will be noticed that one side 153 of each of these notches is made parallel with the radius of the index wheel, and the other side 154 is at an angle thereto which is also the shape of the pawl, so that one side will always be square and true and the angularly disposed faces will receive all the wear. The depth of the notches is such that the pawl will not bottom, thus to be able to compensate for wear. The pawl 152 is carried by a lever 155, the hub of which 156 is loose upon the cam shaft 97 and has upwardly projecting fingers 157 for engaging the sides of the index wheel whereby the lever 155 will be caused to travel back and forth upon the cam shaft with the travel of the index wheel, which is caused to reciprocate with the turret and turret barrel. The pawl is held against the periphery of the index wheel for a short period prior to the indexing by means of a coiled spring 158 fast to the lever 155 and having a ring 159 surrounding the hub 160 of the index wheel 150. The lever 155 is rocked by means of a rocking cam 161 loose upon a stud shaft 162, and which cam 161 is long enough to accommodate the travel of the arm 155 and the roll 163 which is in engagement with such cam incident to the reciprocation of the turret barrel. An arm 164 is fast with the cam 161 and is connected to a rock lever 165 by means of a link 166, and which rock lever has a roll 167 for the engagement of a cam 168 upon the cam shaft whereby at the proper time during the rotation of the cam shaft the indexing pawl will be withdrawn from the notch in the indexing wheel and at the proper time it will be permitted to engage the perimeter of the index wheel and snap into position to properly position and hold in position the turret barrel.

It will be noted in Fig. 17 that the indented face 170 of the disk 145 is so moved that the corner 171 is just past the center of the star wheel so that the star wheel may then commence its movement of rotation, and the points 172 pass down into the space left by the depressed face 170 of the disk, and after the points 172, adjacent to the slot 141, which at that time is in engagement with the roll 143, have passed beyond the concavity in the disk the perimeter of the disk will again have come into position so that it will abut the face 142 and stop the rotary movement of the star wheel and of the turret, and at the same time the indexing pawl will index and hold the parts, as seen in Fig. 19, after which the disk 145 will assume the position seen in Fig. 20 and then complete the locking of the turret in position.

Since this present improvement is intended for use where a number of pieces will be finished having the successive operations performed upon them by the various tools carried by the spindles, one operation being performed after the other as the turret is rotated step by step, the chucks must be in such a position that they will center the work at equal radial distances from the axis of the turret and the tool spindles must be centered at radial distances from the axial line of the turret equal to the radial distances of the chuck centers therefrom; thus as the turret is indexed around the center of each piece of work will be brought in alinement with the center of the spindle opposite which it is presented and toward which it will be advanced. By this means each tool will perform its work relative to the proper center of the piece of stock, and it is to prevent torsional movement being imparted to the turret barrel and angular movement imparted to the turret that a suitable slide rest is provided for sustaining the turret against the rotary thrust of the tools in working upon the stock held by the turret.

When one or more tools are working upon stock held in the chucks of the turret there is a tendency for the turret to yield toward the direction of rotation of the tools working upon the stock, and this would subject the turret and barrel to torsional strain; to relieve such torsional strain a steady rest 175 for the turret is provided, which steady rest is illustrated in Figs. 25 to 28 inclusive and has a body portion 176 having an extension 177 provided with a guideway 178 for engaging a gib 179 upon the bed of the machine. The upper face of the body portion is provided with a gib 180 and is at an angle to the slideway 178 and upon which gib is mounted a slide 181 having a slideway 182 for engaging the gib 180, and which slide has a face 183 for engaging suitable faces 184 upon the turret, which faces constitute ledges, as it were, or abutments. Screws 185 are tapped into each end of the body portion 176 and their heads engage the ends of the slide 181 whereby the height of the face 183 may be readily adjusted as occasion may demand by shifting the slide up or down the inclined plane of the top of the body portion 176. The turret steady rest must be got out of the way of the turret when the same is indexed around, and for the purpose of shifting the steady rest into and out of its operative positions it is provided in the present instance with an extension 186 to which a link 187 is pivoted, which is also pivoted to a lever 188 pivoted to the frame of the machine and carrying a roll 189 for the engagement of straps 190 and 191 upon a cam wheel 192 fast upon the cam shaft 97. The steady rest will be withdrawn from the turret as the turret is being retracted and will be out of the way of the turret when the same indexes, and as the turret advances toward its work the steady rest will be advanced toward the turret and the face 183 will be positioned under one of the ledges 184 prior to the engagement of the tools with the work.

By reference to Figs. 25 to 28, inclusive, of the drawings, it will be seen that the upper portion of the steady rest is provided with square sharp corners, and by reference to Fig. 22 it will be seen that the shoulders 184 of the turret are provided with square sharp corners. After the turret has been brought to the proper angular position, by the shifting, indexing and locking mechanism provided therefor, the steady rest will be drawn under one of the stop faces 184, and owing to the sharp corners whatever dirt or chips may have fallen upon the top of the steady rest will be brushed off, so that the steady rest will be kept clean in this regard. It may be noted in this connection that the steady rest has nothing to do with the positioning, precisionizing or locking of the turret in its proper position. This is all done by other parts of the mechanism, and after such other parts have performed their functions then the steady rest is slipped into position to prevent the rotary working thrust of the tools turning the turret upon its axis. The steady rest, carried as it is by a substantial portion of the frame, is interposed directly between a shoulder upon the turret and such substantial portion of the frame. The steady rest is, in its construction, rigid and relatively inelastic, so that a rigid support is thus afforded for a turret during the working of the tools.

The accurate adjustment permitted to this steady rest, together with the accuracy of position it imparts to the turret is enhanced by the adjustable taper bushing 76 within the turret, so that the turret is supported by the steady bar 80, accurate adjustment being had between said steady bar and the turret by means of the taper bushing 76, and the turret also being steadied by means of the steady rest, it having an adjustable face 183 whereby absolute accuracy of position may be had.

Although various forms of chucks for holding the work may be employed, yet it has been found in practice that for the same classes of work a chuck box comprising jaws 195 controlled by a right and left hand screw 196, (see Figs. 21 to 24 inclusive), give satisfactory results; the jaws are slidable in suitable channels 197 in the face of the turret and are prevented from outward movement by means of a rib 198 engaging suitable slide-ways therein. The jaws have right and left screw thread sockets 199 for engaging the right and left hand threads on the screw, which screw is shown as having a reduced or waist portion 200 for the engagement of the bifurcated end of a pin 201 set into the turret and held in place by means of a suitable set screw 202. The right and left hand screw may be provided with a squared end 203 so that the idle chuck may be readily operated by the workman for removing the finished piece of work and inserting a rough and unfinished piece, this taking place during the operation of the tools or the advance of the turret as occasion may demand. The end of the turret barrel may be screw-threaded as at 204 and have upon it a collar 205 which may be adjusted so that in the forward position of the turret the collar will abut the face of the star wheel and act as a forward stop for limiting the movement of the turret should there be any overthrow or back lash. This is useful when the surfaces finished must be at a given distance from some other part of the piece which is being worked upon. After the collar has been adjusted it may be locked in its adjusted position by some suitable set screw 206.

It will be noticed that the spindles and the socket for carrying a work positioning member are arranged at the angles of a regular polygon, which in the present illustration is shown as a regular pentagon, and that the centers of the work holding chucks are also arranged at the angles of a similar polygon.

The machine herein illustrated embodies but four spindles, which in many instances will be ample for the work which is intended to be performed; but where more than four operations are to be performed upon the same piece of work at one chucking, the machine may be equipped with the required number of spindles for carrying the necessary tools, in which case they will be arranged, as above referred to, as will also the work holding positions upon the turret.

Having thus described my invention, I claim:

1. The combination with a series of tool spindles, of a series of tools carried thereby one of which is a threading tool, a work holder, means for feeding the work holder toward said tools, means for feeding said threading tool toward the work holder, and means for concurrently operating said feeding means.

2. The combination with a series of tool spindles, of a work holder and a lead screw for feeding the same toward the spindles, a threading tool carried by one of the spindles and a lead screw for feeding the threading tool toward the work holder, the sum of the pitches of the said lead screws being equal to the pitch of the thread to be cut, and means for concurrently operating said lead screws.

3. The combination with a number of tool spindles, of a work holder and a lead screw for feeding the same toward and a lead screw for withdrawing the same from the spindles, a threading tool carried by one of the spindles and a lead screw for feeding the threading tool toward the work holder, and a lead screw for backing the tool off the work, the sum of the pitches of the said feed lead screws being equal to the pitch of the thread to be cut, and the sum of the pitches of the backing lead screw and the work holder lead screw being equal to the thread cut, means for successively operating the threading tool lead screws and means for operating said work holder lead screws concurrently therewith.

4. The combination with a rotary spindle, and a turret, one of these being adapted to carry a tool and the other to carry the work for such tool, of means for feeding the turret toward and from the spindle, means for rotating the turret step-by-step, means for locking the turret after each rotative step, and a steady-rest for supporting the turret from the rotary thrust of the working engagement between the tool and the work.

5. In a machine tool having a frame, the combination with a turret provided with a series of stop faces, means for reciprocating the turret, means for rotating the turret step by step, a steady rest shiftably mounted on the frame for interposition between the frame and the stop faces on said turret, means for adjusting the height of said steady rest, and means for actuating the steady rest.

6. In a machine tool having a frame, the combination with a turret provided with a series of stop faces, means for reciprocating the turret, means for rotating the turret step by step, a steady rest shiftably mounted on the frame for interposition between the frame and the stop faces on said turret, and means for actuating the steady rest.

7. The combination with a series of tool spindles, one of which embodies means for controlling a threading tool, of a turret dial for carrying a piece of work to each of said tools for simultaneous operation, cam mechanism for actuating the turret in its longitudinal traverse, and embodying a cam and cam shaft, a train of gear from said threading spindle for driving said cam shaft, and means controlled by the cam shaft for rotating the turret for presenting each piece of work serially to each tool.

8. The combination with a plurality of tool spindles, means for driving some of these, means for driving one of said spindles independently of the others and embodying a pair of oppositely driven pulleys and means for operatively connecting the same to said spindle for forwardly driving and for reversing the same, a reciprocatory turret for carrying the work, and means continuously driven by one of said pulleys for reciprocating said turret.

9. The combination with a series of tool spindles, of a threading tool carried by one of said spindles, means for presenting work serially to said spindles, a number of belt pulleys for individually driving said spindles, a cam shaft geared to that one of said spindles carrying the threading tool, and cams thereon for advancing the work toward the spindles.

10. The combination with a work holding turret, of a series of tool spindles, friction driving means for individually driving said spindles, a threading tool carried by one of these, and means driven by the individual driving means of the spindle carrying the threading tool for spirally advancing the tool carried thereby toward the turret.

11. The combination with a number of spindles and frictional means for driving a number of these individually one or the other, of a threading tool carried by one of said spindles, a work carrying turret, a cam shaft and cams thereon for advancing the turret relatively to said spindles, and positive drive gearing connecting the driver of the said threading tool carrying spindle to the cam shaft.

12. In a machine of the character described, the combination with a spindle, of a chuck reciprocatively carried thereby, a work carrier reciprocatory in a path parallel to the path of reciprocation of the chuck, a cam shaft, a cam thereon for reciprocating the carrier, a cam thereon for reciprocating the chuck, a pair of oppositely driven pulleys for rotating the spindle for giving it its forward drive and its reverse respectively, and a train of gearing connecting said forward driving pulley with the cam shaft.

13. In a machine of the character described, the combination with a spindle, of a chuck carried by and reciprocable with respect to the spindle, a shaft, a cam thereon for reciprocating the chuck, means for rotating the spindle for giving it its forward drive and its reverse respectively, and gearing connecting said forward driving means with the shaft.

14. In a machine of the character described, the combination with a spindle, of a chuck reciprocatively carried thereby, a work carrier reciprocatory in a line parallel to the line of reciprocation of the chuck, means for reciprocating the said carrier and the chuck, means for giving the spindle its forward drive and its reverse respectively, and a train of gearing connecting said forwardly driving means with the reciprocating means.

15. The combination with a turret having a number of work holding chucks for holding a number of pieces of work centered at equal radial distances from the center of the turret, a number of tool spindles centered at radial distances from the axial line of its turret equal to the radial distance of the chuck centers therefrom, an adjustable compensatory bushing in said turret, a steady bar fast with the frame and mounted in said bushing, a steady rest for engaging said turret and holding it against the rotary thrust of the tools and means for adjusting the engaging surface of said steady rest.

16. The combination with rotary tool spindles, of a work carrying turret, means for advancing the turret toward the spindles and for retracting the same therefrom, means for rotating the turret step by step and connected with and controlled by the advancing and retracting means for advancing it one rotary step after each retraction, a steady rest for said turret for supporting it against the rotary thrust of tools carried by the spindles, means for retracting and advancing the steady rest and connected with and controlled by the turret advancing and retracting means for withdrawing the steady rest from the turret as the same retreats and for advancing the steady rest to meet the turret upon the inauguration of the advance of the same.

17. The combination with a machine frame, of a spindle mounted thereon, a pair of drivers continuously rotatable in opposite directions, and a friction clutch for alternately connecting these with said spindle for forwardly driving and for reversing the same, a chuck reciprocatory upon said spindle, a turret reciprocatory toward and from the spindles in a path parallel to the path of reciprocation of said chuck, a cam shaft, a train of gearing connecting said cam shaft with the forward driver for the chuck carrying spindle, a lever for reciprocating said chuck, a cam upon the cam shaft and having a cam strap in the nature of a lead screw and engaging said lever, a turret barrel carrying said turret, a steady bar connected to the frame and entering the turret barrel, a yoke embracing the turret barrel and longitudinally movable therewith, means for preventing the angular movement of the yoke, an anti-friction roller upon said yoke, a cam upon said cam shaft, cam strap thereon for engaging said roller and being in the nature of a lead screw, means for taking the working thrust of said cam, and means for rotating the turret step by step.

18. In a device of the character specified, the combination with a machine frame, of a plurality of spindles mounted thereon, a countershaft and a belt pulley for driving one of said spindles, a countershaft, a belt pulley thereon and a train of gear for driving two other of said spindles, a pair of oppositely driven belt pulleys, a friction clutch for alternately connecting these with the fourth spindle, said fourth spindle being adapted to carry a threading tool, a chuck mounted upon said spindle and reciprocable thereon, means on the frame for carrying a work positioning member, said work positioning member and four spindles being arranged at the angles of a pentagon, a turret mounted in opposition to said spindles and carrying five chucks arranged at the angles of a pentagon, a cam shaft mounted upon the machine frame, a train of gearing driven by the forward driving pulley for the threading spindle, and having driving connection with the cam shaft, a cam drum controlled by the cam shaft and for the turret barrel and having strap cams for driving the same forward and for returning same, means for taking the thrust from the turret barrel during the forward drive thereof, a cam drum controlled by the cam shaft and having straps, a lever operable thereby and connected with the friction clutch, a cam drum controlled by the cam shaft and having straps, a lever operable thereby and connected to the chuck for reciprocating the same.

19. The combination with a rotary and reciprocatory turret, of a star wheel splined to said turret, means for holding the star wheel from reciprocation with said turret, means for rotating the star wheel step by step, means for locking the star wheel from angular movement between the steps, an indexing wheel fast with the turret, a pawl for engagement therewith, a shaft parallel with the path of reciprocation of the index wheel and the turret, a lever carrying the pawl and loose on said shaft, fingers on said lever in engagement with the wheel for reciprocating the lever with the wheel, a rock cam mounted in engagement with said lever for throwing the same and longer than the path of reciprocation of the index wheel, means for rocking said cam, and means for holding said lever and cam in engagement.

20. The combination with a rotary and reciprocatory turret, means for rotating the turret step by step, an indexing wheel fast with the turret, a pawl for engagement therewith, a shaft parallel with the path of reciprocation of the indexing wheel, a lever carrying the pawl and loose on said shaft, fingers on said lever in engagement with the wheel for reciprocating the lever with the wheel, a rock cam in engagement with said lever for throwing the same and longer than the path of reciprocation of the indexing wheel, and means for rocking said cam.

21. The combination with a number of rotary tool spindles, a rotary and reciprocatory turret for carrying the work for said tool spindles and it having a number of abutment faces, a steady rest for said turret, said steady rest having an inclined plane upon its upper face, a gib thereon, an adjustable face member having a gib-way therefor and means for adjusting said member along said gib for adjusting the height of said steady rest, means for reciprocating said turret and for rotating the same step by step, and means controlled by the turret actuating means for reciprocating said steady rest into and out of position for engaging with the abutment faces upon the turret.

22. The combination with a number of rotary tool spindles one of which is adapted to carry a threading tool, of means for rotating said threading tool spindle independently of the others, means for feeding the work toward and from the spindles and embodying a cam shaft, a train of gears between said threading tool spindle driving means and the cam shaft, and embodying interchangeable change gears, and means for connecting and disconnecting the cam shaft from the spindle driver.

23. In a machine tool having a frame provided with a slideway, the combination with a turret having a series of stop faces, means for reciprocating the turret, means for rotating the turret step by step, means for locking the turret against rotation, a steady rest shiftably mounted on said slideway on the frame for the engagement of said stop faces and having a body portion provided with a gib at an angle to the slideway, a slide having a slideway for engaging the gib and mounted thereon and which slide has a face for engaging the stop faces upon the turret disposed parallel with the slideway on the frame, means for adjusting said slide upon said gib, and means for sliding the steady rest upon its slideway.

24. In a machine tool, the combination with a turret provided with a stop face having a sharp edge, of a steady rest for engaging said stop face and having a sharp edge, and means for sliding the steady rest into engagement with said stop face and initially bringing said sharp edges together for cleaning the engaging surfaces of said stop faces and steady rest.

25. The combination with a number of tool spindles, of a work holder and a lead screw for feeding the same toward and a lead screw for withdrawing the same from the spindles, reversible driving mechanism for one of the spindles, a lead screw and means actuated thereby for controlling said reversible driving means, a reciprocatory chuck carried by said spindle, a threading tool carried by said chuck, a lead screw for feeding said chuck and threading tool toward the work holder, and a lead screw for withdrawing the chuck and backing the tool off the work, means for successively operating the threading tool lead screws, and means for operating said work holder lead screws concurrently therewith.

26. The combination with a machine frame having a pair of bearings, of a gear wheel at the inside of one of said bearings and having a hub mounted therein and extending beyond said bearing, a steady bar having one end mounted in said hub, a bushing in the other of said bearings supporting said steady bar and extending inwardly over the same, a bushing on said steady bar adjacent to said gear wheel, a quill mounted upon said bushings, guiding members carried by said hub and disposed parallel with the axis of the same, a chuck guided by said guiding means and having a portion entering the bore of the hub, a gear wheel keyed to said quill, a train of gears between said gear wheel keyed to the quill and the gear wheel having its hub mounted in said bearing, a pair of pulleys loose on said quill for rotation in opposite directions and each having a friction clutch face, friction clutch members for engaging said pulley clutch faces and positively connected to the quill, a cam shaft, a gear wheel carried by one of the pulleys, a train of gears driven thereby for rotating the cam shaft, cams on the shaft for alternately actuating the friction clutches, and cams on the cam shaft for reciprocating the chuck.

27. In a machine of the character described, the combination with a rotary member, of a chuck reciprocatably carried thereby, a work carrier reciprocatory in a line parallel to the reciprocation of the chuck, a pair of pulleys, clutches for connecting the respective pulleys with the said rotary member for rotating the same, means for reciprocating the said carrier and the chuck and controlling the friction clutches, and a train of gearing driven by one of said pulleys for controlling the reciprocating and clutch actuating means.

GEORGE G. PRENTICE.

Witnesses:
FRED. J. DOLE,
CHAS. LYON RUSSELL.